Sept. 27, 1960 P. C. WILBUR 2,954,063
PIT GRIPPING DEVICE
Filed Sept. 25, 1957 2 Sheets-Sheet 1
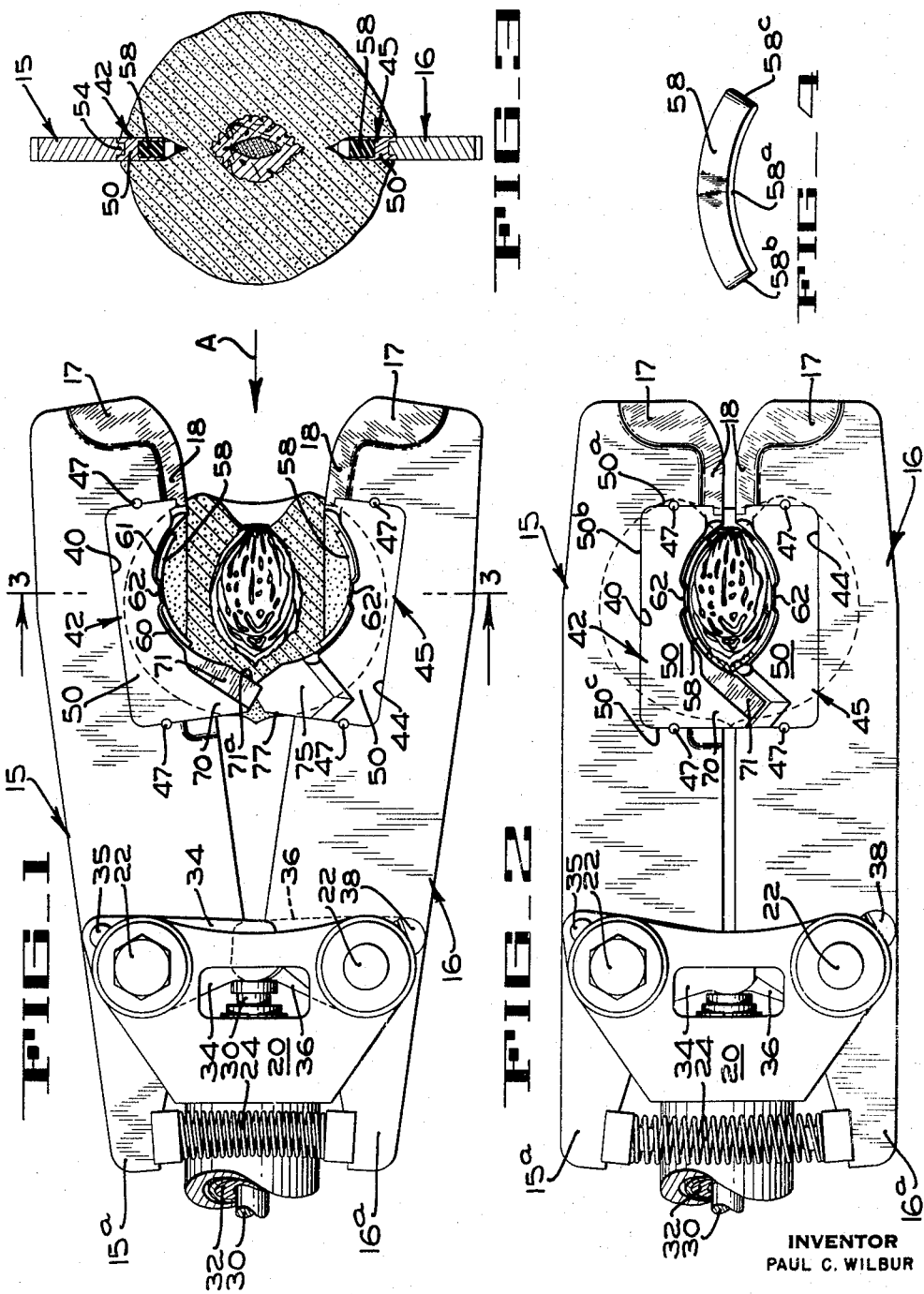
INVENTOR
PAUL C. WILBUR
BY Hans G. Hoffmeister
ATTORNEY Sept. 27, 1960     P. C. WILBUR     2,954,063
PIT GRIPPING DEVICE
Filed Sept. 25, 1957     2 Sheets-Sheet 2
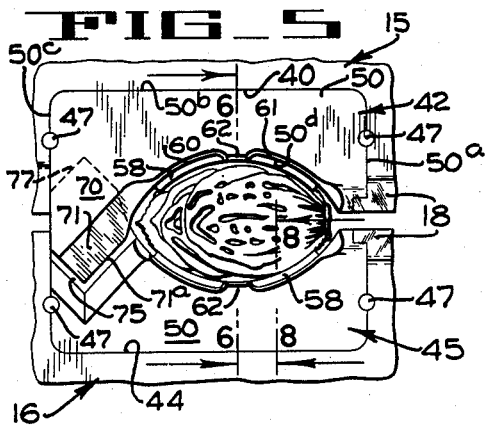
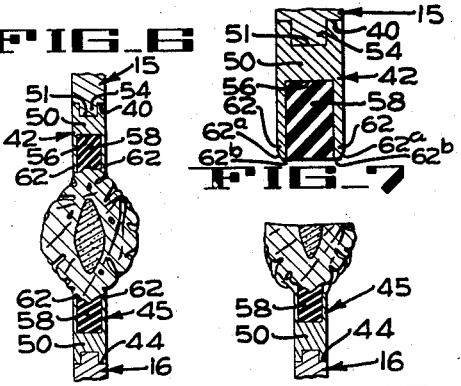
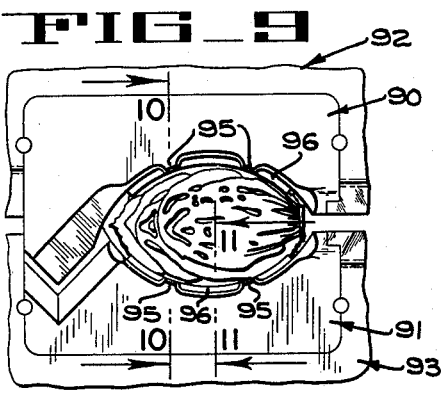
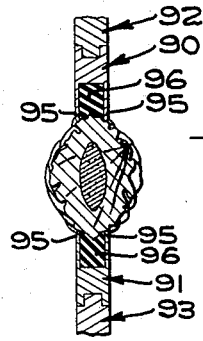
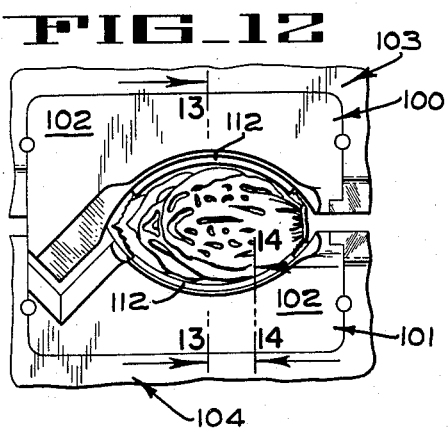
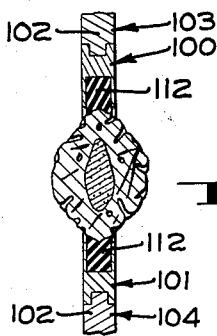
INVENTOR
PAUL C. WILBUR
BY Hans G. Hoffmeister
ATTORNEY United States Patent Office 2,954,063
Patented Sept. 27, 1960

2,954,063
PIT GRIPPING DEVICE

Paul C. Wilbur, San Jose, Calif., assignor to Food Machinery and Chemical Corporation, San Jose, Calif., a corporation of Delaware Filed Sept. 25, 1957, Ser. No. 686,171

6 Claims. (Cl. 146—28)

This invention pertains to fruit processing equipment, and more particularly relates to apparatus for holding the pit of a fruit in predetermined position during processing of the fruit.

In one method of removing pits from fruit, a pair of oppositely disposed cutting and gripping blades are forced into the fruit until they come into gripping engagement with opposite edges of the pit. While the pit is held in fixed position by the gripping members, the fruit is twisted. In certain types of fruit, such as peaches, the outer surface of the pit has a plurality of thin outwardly projecting ridges, and many of the ridges have recesses formed under them so that substantially the entire surface of the pit, and especially the peripheral surface of the pit in the suture plane of the fruit, is relatively weak and subject to being broken away under the pressure of the gripping members. As a result, the gripping members are not able to efficiently hold the pit when twisting forces or the like are applied to the flesh of the fruit.

An object of this invention is to provide an improved pit gripping means for fruit processing equipment.

Another object is to provide an improved element for a fruit holder, said element being adapted to grip the pit of a fruit and retain the pit in predetermined position when twisting pressures or the like are applied to the flesh or meat of the fruit.

Other and further objects of the present invention will become apparent from the following description taken in connection with the attached drawings, in which:

Fig. 1 is a side elevation of a pair of fruit cutting and gripping members constructed in accordance with the teaching of the present invention, a portion of the gripper operating mechanism and a peach partially gripped by the members being shown.

Fig. 2 is a view similar to Fig. 1, but showing the cutting and gripping members in a pit-gripping position.

Fig. 3 is a vertical section taken on line 3—3 of Fig. 1.

Fig. 4 is a perspective of the rubber element used in each gripping member of Fig. 1.

Fig. 5 is a fragmentary side elevation of the gripping elements of the device of Fig. 1 shown engaged with the pit of a peach, the flesh of the peach being omitted from the view to more clearly show the action fo the gripping members.

Fig. 6 is a section taken on line 6—6 of Fig. 5.

Fig. 7 is an enlarged fragmentary view of the mechanism shown in the upper portion of Fig. 6, particularly showing the cross-sectional configuration of one of the gripping members.

Fig. 8 is a section taken on line 8—8 of Fig. 5.

Fig. 9 is a fragmentary side elevation of a second embodiment of the pit gripping elements of the present invention.

Fig. 10 is a section taken on line 10—10 of Fig. 9.

Fig. 11 is a section taken on line 11—11 of Fig. 9.

Fig. 12 is a fragmentary side elevation of a third embodiment of the pit gripping members of the present invention.

Fig. 13 is a section taken on line 13—13 of Fig. 12.

Fig. 14 is a section taken on line 14—14 of Fig. 12.

The pit gripping apparatus of the present invention is illustrated in Figs. 1 and 3 as embodied in a pair of blades or jaws 15 and 16, each of which is relatively thin (Fig. 3) and has a sharpened forward edge portion 17 and a sharpened side edge portion 18. Each blade is pivotally connected to a support member 20 by means of a bolt 22, and a spring 24 that is disposed between end portions 15a and 16a of the blades 15 and 16, respectively, urges the blades toward the closed position of Fig. 2. The blades are moved to open position by a rod 30, which is slidably supported in a tubular support 32. The rod 30 bears against a lever arm 34 which is rigidly secured to blade 15 by capscrew 35, and against a lever 36 which is secured to the blade 16 by a capscrew 38. The rod 30 is arranged to be reciprocated by any suitable means, as by a cam (not shown) on the associated fruit processing machine, to control the opening and closing of the blades.

The blade 15 has a cut-out or recessed portion 40 in which a gripper unit 42 is secured, and the blade 16 has a similar recess 44 which receives a gripper unit 45. The units 42 and 45 may be held in their respective recesses in any suitable manner, as by pins 47.

As best seen in Figs. 5, 6 and 7, the gripper unit 42 comprises an elongated body in the form of a metal block 50 which is of the same width as the blade 15. A groove 51 (Fig. 6) extends along three marginal edges 50a, 50b and 50c of the body 50, and is arranged to receive a tongue 54 formed on the blade 15 along the corresponding three side marginal edges of the recess 40. The fourth marginal edge of the body 50 has a concavely curved portion 50d and has a relatively deep concave groove or socket 56 formed therein. A curved rubber insert 58 (Fig. 4), which has the same configuration as the concave groove 56, is disposed in the groove. When the curved rubber insert 58 is to be positioned in the groove 56, it is first bent in a reverse direction such that its natural concave inner surface 58a is substantially convex. The end portions 58b and 58c of the insert are then positioned in the end portions of the groove, and the central portion of the insert is snapped into position in the groove.

The concavely curved edge portion 50d of the body 50 is beveled inwardly on each side of the rubber insert, as at 60 and 61 (Fig. 5), and these beveled edge portions terminate in curved portions that define a spur 62 which projects away from the body 50. As seen in Fig. 7, each spur 62 has a beveled edge portion 62a and a flat edge portion 62b.

The elongated body 50 of the gripper unit has a projecting guiding and cutting arm 70 (Fig. 5) which has a beveled surface 71. The arm 70 is approximately half as thick as the body 50 and the beveled surface 71 extends from the flat outer face of the body 50 inwardly to terminate in a sharp edge 71a. The side of the arm 70, opposite to that having the beveled surface 71, is generally parallel to the flat outer face of the body 50 and provides a guide surface which is disposed in sliding engagement with a similar flat guide surface 75 (Fig. 5) on an arm 77 of the gripper unit 45.

The gripper unit 45 is identical to the unit 42 but is oppositely positioned in the arm 16. Accordingly, the unit 45 has an elongated body 50 having two spurs 62 disposed on opposite sides of a rubber insert 58. Also, the arm 77 of unit 45 has a beveled surface (not shown) which corresponds to the surface 71 of arm 70. Also, it will be noted that, since both of the guiding and cutting arms 70 and 77 are approximately half as thick as the blades, the arms will have a combined thickness substantially equal to the thickness of each blade.

In operation, a peach is moved onto the blades 15 and 16 in the direction of arrow A when the blades are in the open position of Fig. 1. As the peach is moved onto the blades, it is cut by the blade portions 17 and 18 and finally by the beveled surfaces on the arms 70 and 77 of the gripper units. When the blades are moved to the closed position of Fig. 2, the four spurs 62 and the two rubber inserts 58 engage and grip the pit as shown in Figs. 6 and 8. It is to be particularly noted that the rubber inserts 58 have pit-contacting surfaces that are considerably wider than the fins on the surface of the pit, and therefore, they are able to engage firm pit surfaces in addition to the easily broken fins. Further, the relatively wide contact area of the rubber inserts is effective to distribute the pressure exerted by the blades, over a large area. With this arrangement, pressure is not localized on the pit surface and there is less tendency to break even the relatively weak fins and projections on the pit surface. The action of the rubber inserts in accommodating itself to the surface of the pit is shown in Fig. 8. Since portions of the rubber inserts actually move into depressions in the pit surface, it will be evident that the rubber insert actually engages the pit surface in positive gripping relation as well as in frictional gripping relation. In addition, the spurs 62, which may be approximately one half inch in length measured longitudinally of the blade, dig into and firmly grip the pit and thereby supplement the action of the rubber inserts.

In Figs. 9, 10 and 11 a second embodiment of the fruit holding members of the present invention is illustrated. Two gripper units 90 and 91 are secured in blades 92 and 93, respectively. The units 90 and 91 are identical to the units 42 and 45, previously described, with the exception that each of the gripper units 90 and 91 has four spurs 95, two of which are disposed on each side of a rubber insert 96. The four spurs 95 on each unit are disposed in two transversely aligned pairs, and the pairs are so located relative to the side wall of the rubber insert 96 that the length of the insert is divided into three substantially equal portions.

The two pairs of spurs 95 of each of the gripper units 90 and 91 provide a positive gripping engagement at spaced points on the curved surface of the pit, and the four-point contact of the pairs of spurs provides a particularly effective resistance to turning moments that act on the pit as the flesh is twisted therefrom.

In Figs. 12, 13 and 14, a third embodiment of the fruit holding members of the present invention is illustrated. Two gripper units 100 and 101 are secured in blades 103 and 104, respectively. These units 100 and 101 are identical to the units 42 and 45 of Fig. 5 except that no spurs are provided on the metal body portions 102 of the units 100 and 101. It will be noted in Fig. 14 that a groove 110 is formed in the contact surface of the rubber insert 112 so that the insert will automatically adjust itself over the main longitudinal ridge of the pit with the portions of the rubber insert on each side of the ridge serving to maintain the insert centered over the ridge as the blades are closed. When the blades are closed, as in Figs. 12 and 13, the rubber inserts 112 of each unit 100 and 101 frictionally grip the surface of the pit and hold it in fixed position as the flesh of the peach is twisted away from the pit.

Although rubber pit-gripping elements have been disclosed in the foregoing description, it will be understood that any material may be used that has the ability to conform itself to the surface of the pit and frictionally grip the pit. Accordingly, the term rubber is used generically to include natural rubber and all synthetic elastomeric materials and other equivalent yieldable substances. Also, it is within the scope of the present invention to form the sockets 56 directly in the edge of the blades 15 and 16 rather than forming sockets in removable units such as units 42 and 45.

From the foregoing description it will be apparent that the present invention provides several novel pit-gripping elements which are not only simple in construction but are also capable of firmly gripping and holding a pit during processing of a peach.

It will be understood that modifications and variations may be made without departing from the novel concepts of the present invention.

Having thus described the invention, what I claim as new and desire to protect by Letters Patent is:

1. A pit gripping device comprising a pair of blades having spaced opposed cutting edges, means defining a socket in each of said edges, a resilient pit-engaging member disposed in each socket and having a portion projecting away from the edge of the associated blade, the opposed surfaces of said resilient members being concavely curved and adapted to grip opposite surfaces of a pit disposed between said blades.

2. Apparatus for holding the pit of a fruit comprising a support, a pair of blades mounted on said support for pivoting movement toward and away from each other in a common plane, each of said blades having an edge movable to a position in confronting relation with the edge of the other blade, means defining a socket in each of said edges, means providing a spur on each side of the socket of each blade, the spurs on each blade being laterally aligned and arranged to project outwardly past the edge of the associated blade toward the other blade, and a resilient pit-contacting member positioned in each socket and having an outer portion disposed between said spurs.

3. A pit gripping device comprising a support, a pair of blades pivotally mounted on said support for movement in a common plane to a closed position in which opposed edges of said blades are in adjacent position and cooperate to grip a pit therebetween, means defining a socket in each of said opposed edges, a rubber pit gripping member disposed in each socket, each of said members having an inner portion disposed in its associated socket and an outer concavely curved portion projecting outwardly from the edge of the blade, and spurs on each blade on each side of the outer concavely curved portion of each rubber member.

4. In a pit gripping apparatus of the type in which a pair of blades are provided with opposed edges adapted to grip between them the pit of a fruit that has been cut to the pit, the improvement which comprises a resilient pit-contacting member mounted on each of the opposed edges, each resilient member being disposed opposite the other resilient member and arrange to project outwardly from the associated blade edge in a direction toward the other resilient member, means defining a plurality of spurs on each blade adjacent each side of the associated resilient member, and means for effecting relative movement between said blades to cause said resilient members and said prongs to grip the pit of a fruit disposed between the blades.

5. Apparatus for gripping a pit comprising a pair of relatively flat blades adapted to be disposed in a common plane and having first edge portions for cutting the flesh of a whole fruit and having second edge portions for receiving therebetween the pit of the whole fruit, means defining a recess in each of said second edge portions, a gripper unit secured in each recess and having a rubber pit-contacting member projecting outwardly to a point past the second edge portion of the associated blade, said rubber pit-contacting member being disposed in opposed relation and adapted to engage and grip the pit of a fruit disposed between said blades.

6. In combination with a pair of blades adapted to lie substantially in a common plane, means for relatively shifting said blades toward and away from each other, each of said blades being provided with an edge portion having a socket therein, resilient pit-contacting element disposed in each socket, and means providing two pair of pit-engaging spurs on each of said edge portions spaced longitudinally of said blade, each pair of spurs having one spur disposed on each side of said resilient pit-contacting element.

References Cited in the file of this patent

UNITED STATES PATENTS

| | | |
|---|---|---|
| 569,284 | Jacks | Oct. 13, 1896 |
| 935,013 | Gilchrist | Sept. 28, 1909 |
| 2,055,854 | Stibbe | Sept. 29, 1936 |
| 2,272,415 | McLauchlan | Feb. 10, 1942 |
| 2,826,227 | Perrelli et al. | Mar. 11, 1958 |

FOREIGN PATENTS

| | | |
|---|---|---|
| 384,772 | Great Britain | Dec. 15, 1932 |